BYPASS PROPORTIONER

Original Filed Aug. 20, 1958 2 Sheets-Sheet 1

INVENTOR.
JACK H. BRAZIER
BY Pyle & Fisher
ATTORNEYS

INVENTOR.
JACK H. BRAZIER
BY Pyle & Fisher
ATTORNEYS

United States Patent Office

Re. 25,037
Reissued Sept. 12, 1961

25,037
BYPASS PROPORTIONER

Jack H. Brazier, Smithville, Ohio, assignor to Akron Brass Manufacturing Co., Inc., Wooster, Ohio, a corporation of Ohio Original No. 2,953,160, dated Sept. 20, 1960, Ser. No. 756,235, Aug. 20, 1958. Application for reissue Jan. 6, 1961, Ser. No. 81,206
4 Claims. (Cl. 137—599.1)

Figure 1:
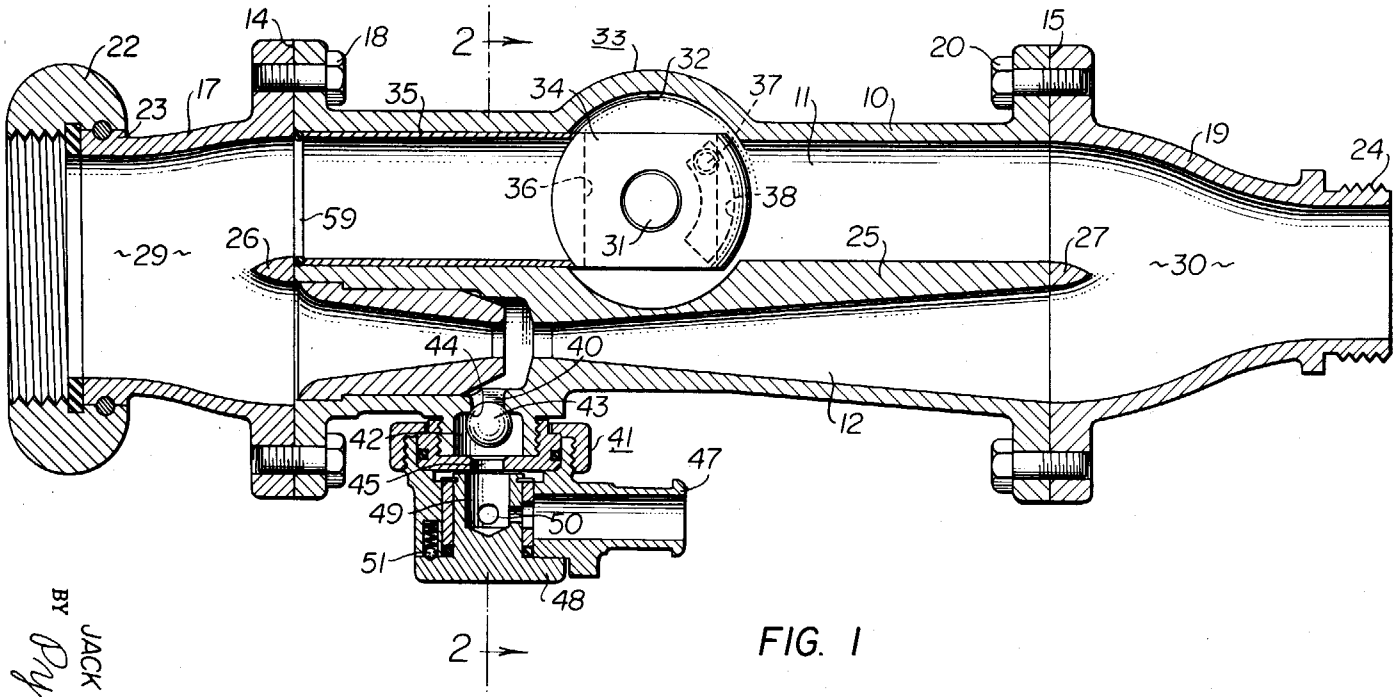

Matter enclosed in heavy brackets [ ] appears in the original patent but forms no part of this reissue specification; matter printed in italics indicates the additions made by reissue.

This invention pertains to a fire-fighting apparatus, and more particularly, to that class of apparatus known as proportioners, or eductors.

In fighting fires, substances are often mixed with water to generate "mechanical" foam. This application deals with the class of mechanisms known as "proportioners" or "eductors" which are used for mixing "mechanical foam" producing substances into a stream of water. A proportioner utilizes a venturi tube principle to mix these substances in water.

Often proportioners are used when water containing a foam producing substance is emitted from a nozzle of the class of nozzles which are primarily designed for combating fires with water alone. The proportioner of this invention is primarily suited for use with such class of nozzles. When a detergent mechanical foam producing substance is used with a "water" nozzle, a volume expansion in the neighborhood of seven to nine times is obtained. When compared with nozzles designed especially for mechanical foam emission, this expansion is relatively small. Nonetheless, it is often desirable to use a proportioner to introduce mechanical foam producing agents into a fire fighting line used with a "water" nozzle, because it provides an inexpensive mechanism which combines the attributes of water fire fighting techniques with the attributes of foam fire fighting techniques. The foam provides a smothering, insulating and cooling blanket which tends to adhere to a wetted surface, whether that surface is vertical or horizontal.

Previously, a fireman fighting a fire with a water nozzle with a prior known proportioner connected into the hose line was under a handicap if foam was not being used, because a substantial portion of the pressure head was dissipated by the venturi of such a proportioner. On the other hand, if the hose line did not include a proportioner, a considerable amount of time was lost when the fireman wished to change from plain water to foam. It then was necessary to shut off the water supply and connect the prior known proportioner into the line. The time lost when prior known proportioners have been connected into hose lines has often been costly.

The primary object of the present invention is to overcome the problems which have been experienced with prior art proportioners, by providing a novel and improved proportioner which may be connected into a line at all times, but which at the same time, will not cause any appreciable reduction in pressure head when water alone is being used.

Stated conversely, the primary object of this invention is to provide a proportioner which may be connected in series with a fire fighting nozzle and which will not cause an appreciable pressure head loss when plain water is being used as a fire combating substance.

Another object of the invention is to provide a novel and improved proportioner which permits the instantaneous introduction of foam into a fire fighting line without providing any adverse effect on any of the fire fighting apparatus to which it is connected.

A further object of the invention is to provide a novel and improved proportioner having a by-pass passage paralleling the venturi, in which the cross sectional area of the throat of the venturi plus the cross sectional area of the by-pass passage is greater than the cross sectional area of the fluid passage in a connected fire fighting hose.

A more special object of the invention is to provide a novel and improved fire fighting proportioner which has a body having first and second parallel passages, one of which passages is a venturi, and the other of which passages has a shut off valve to permit the other passage to be left open when ordinary water is used, and shut off when foam is desired.

Still another specialized object of the invention is to provide a proportioner made in accordance with the foregoing objectives to which a foam introducing assembly is connected, and which assembly includes unidirectional check valve means to prevent the reverse flow of fluid through the assembly.

Another more specialized object of the invention is to provide a foam introducing assembly which includes a novel and improved selector mechanism which may be positively and accurately indexed to any of a plurality of accurately and automatically obtained adjustment positions or to a shut off position to provide a desired quantity of foam producing agent.

Figure 2:
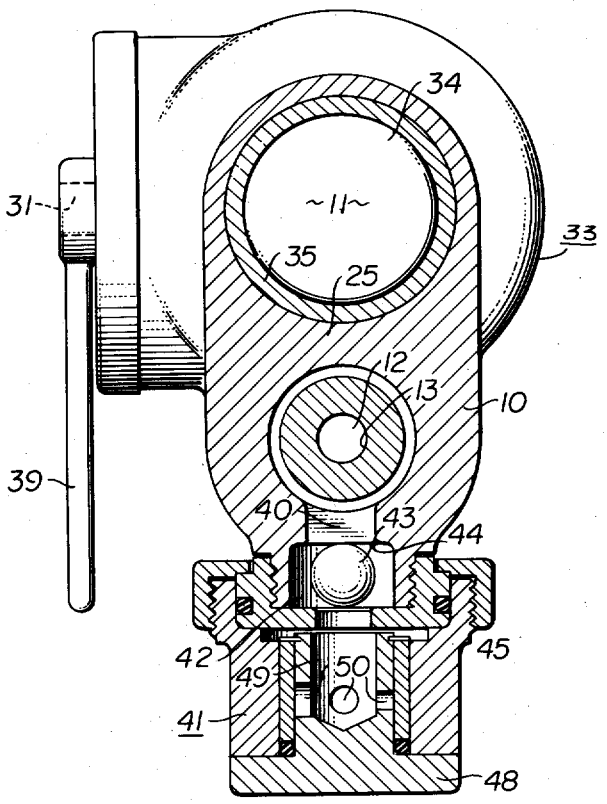

Other objects and a fuller understanding of the invention may be had by referring to the following description and claims, taken in conjunction with the accompanying drawings, in which:

FIGURE 1 is a sectional view of an improved proportioner as seen from a longitudinally extending plane of cross section; and, FIGURE 2 is a sectional view of the device on an enlarged scale with respect to FIGURE 1 and as seen from the plane indicated by the line 2—2 of FIGURE 1.

Referring to the drawings, and to FIGURE 1 in particular, a body 10 is provided. The body has two through and preferably substantially parallel fluid passages 11, 12. The fluid passage 11 is a by-pass passage, and the fluid passage 12 is a venturi having a throat area shown generally at 13.

The body has inlet and outlet ends 14, 15. An inlet end member 12 is connected to the body inlet end 14 by suitable means such as bolts 18. An outlet end member 19 is connected to the body outlet end 15 by suitable means such as bolts 20. The inlet member 17 has a female fire house connection element 22 swivelably carried at a hose connection end 23. The outlet member 19 has a hose connection end 24 which is externally threaded to provide a male hose connection.

The body 10 is preferably a one piece casting which has a web 25 formed between the by-pass through passage 11 and the venturi through passage 12. The end members 17, 19 may have web portions 26, 27 respectively which form extensions of the web 25. The end members 17, 19 have through fluid passages 29, 30 respectively, both of which communicate with both of the body passages 11, 12. In the preferred and disclosed form the body connection end of the passage 29 and the body connection end of the passage 30 are divided respectively into two passages by the webs 26, 27.

A valve chamber 32 is formed at about the longitudinal midpoint of the passage 11. The valve chamber 32 is somewhat cylindrical in contour and generally normal to the axis of the passage 11. A ball type shut off valve shown generally at 33 is provided. The shut off valve 33 has a valve body or ball 34 which is pivotal about a pin 31. The valve body 34 coacts with a sleeve seat member 35 to provide a shut position when the valve body is in the position of FIGURE 1. The valve body is rotatable 90° to align a through fluid passage 36 formed in the body 34 with the passage 11. A stop pin 37 projects into a groove 38 which is a 90° segment of an annulus in the valve body. The pin 37 and groove 38 provide a positioning stop for the valve body in both the open and the closed positions. A valve actuating handle 39 (FIGURE 2) is fixed to the pin 31 to rotate the ball 34 selectively to the open or to the closed position. An O-ring 59 is disposed between the sleeve 35 and the end cap 17 to form a seal therebetween. The O-ring 59 also serves a second function which is unique. The O-ring is maintained under compression and it urges the sleeve against the ball 34 to maintain contact between the two at all times.

The body 10 has a foam inlet opening 40 formed at the venturi throat 13. A foam introducing assembly is shown generally at 41. The foam introducing assembly is connected to the foam inlet opening 40 to transport foam to the opening. The assembly 41 includes a check valve chamber 42. A ball 43 is loosely carried in the chamber 42.

The ball 43 may move upwardly to the position shown in the drawings when foam is being introduced in the venturi. The ball 43 when so positioned about a rectangular chamber outlet opening 44. Foam passes between the ball and the corners of the rectangular opening. When the flow of foam is stopped, the ball moves vertically downwardly to seat against the circular check valve seat 45 to prevent the reverse flow of fluid through the chamber. Thus, if a connected nozzle is shut off, the venturi throat will immediately change from an area of negative pressure to an area of high positive pressure. The ball seats against the check valve seat 45 and prevents the reverse flow of water through the chamber. When water alone is being provided to the nozzle, the valve 33 is in an open position, and the check valve ball 43 is seated against the circular valve seat 45 under pressure of water passing through the proportioner. The ball and chamber openings thus, together, form an inexpensive, simple and positive unidirectional check valve means.

The assembly 41 also includes an inlet tube 47 and a selector 48 which provides one of the outstanding advantages of the invention. The selector 48 has a passage 49 which communicates with the chamber 42 and a passage through the tube 47. The selector 48 has a plurality of inlet apertures 50. The inlet apertures may be indexed selectively and one at a time to communicate with the passage of tube 47. The inlet apertures 50 are of various sizes to provide selective control of the volume of foaming agent introduced into the venturi throat 13. A detent assembly 51 is provided to hold the selector in an indexed position. Thus, the selector may be accurately and positively indexed from one position to another. When the detent is engaged, an accurately sized inlet aperture is properly aligned to provide the precise and desired amount of foam agent.

One of the outstanding advantages of this device is that it may be used selectively for efficiently providing either water or foam. When water alone is provided, there is substantially no loss of head. When foam is desired the change from water to foam is achieved almost instantaneously by positioning the valve 33 and the selector 48. One of the principal reasons that there is substantially no loss of pressure head when water alone is being used is that the cross sectional area of the most constricted portion of the throat 13, plus the cross sectional area of the passage 11, is slightly greater that the cross sectional area of the outlet member at the outlet end 24 and of the passage in a connected fire hose.

This construction in which the combined cross sectional areas of the passages 11, 12 are slightly greater than that of the outlet at the end 24 when the valve 33 is open provides a mechanism in which there is substantially no pressure head loss. This permits a slight reduction of velocity head when water flows through the open proportioner. Substantially all of the velocity head is regained when the water passes through the outlet member. The use of gradually divergent tapered walls in the inlet member and gradually converging walls in the outlet member respectively permit a reduction of, and a regaining of, velocity head. The reduction of the velocity head as water passes through the proportioner decreases the pressure loss, since pressure drop is proportional to the rate of flow. Even though there is little head loss when the device is open, when converted to a foam producing assembly by rotating the selector 48 to close the valve 33, the device becomes a highly efficient proportioner.

While the invention has been described with a great deal of clarity and detail, it is believed that it essentially comprises a proportioner for introducing a mechanical foam producing agent into a fire fighting quantity of water, which proportioner has a body having a by-pass passage, a valve to selectively open or close the by-pass passage, a venturi paralleling the by-pass passage, and means to introduce a foam producing agent to the venturi throat.

Although the invention has been described in its preferred form with a certain degree of particularity, it is understood that the present disclosures of the preferred form has been made only by way of example and that numerous changes in the details of construction and the combination and arrangement of parts may be resorted to without departing from the spirit and the scope of the invention as hereinafter claimed.

What is claimed is:

1. A fire fighting foam producing proportioner comprising, a tubular body having first and second spaced ends, said body having first and second generally parallel through passages, said body including a longitudinally extending web separating said first passage from said second passage, said body having a longitudinal axis extending through said web, said web having the form of an air foil, said web tapering to a leading edge near said first end of said body and tapering to a trailing edge near said said end of said body, said web extending along substantially the entire length of said body, a tubular inlet member defining an inlet opening and fixed to said first end of said body, a tubular outlet member defining an outlet opening and fixed to said second end of said body, the axes of said members and said body being [coextensive] *on a common line,* hose connection means carried by said inlet and outlet members, said members each being connected to both of said passages, said first passage being a venturi having a throat therein, said second passage having substantially uniform cross sectional area from one end to the other, the total of the cross sectional area of said first passage throat and the cross sectional area of said second passage being greater than the cross sectional area of the [inlet] *outlet* opening, the cross sectional area of the inlet opening being greater than the cross sectional area outlet opening, a shut off valve carried by the said body and disposed in said second passage to open and close said second passage, a foam agent inlet opening communicating with said first passage, a foam agent conducting assembly communicating with said foam agent inlet passage, said assembly having a check valve permitting only unidirectional flow from said assembly into said foam agent inlet opening, said assembly having a flow control valve and an inlet [type] *tube* in supplying communication with the control valve, the control valve including a selector having a plurality of inlet apertures, said flow control valve being in communication with said check valve, said inlet apertures being selectively positionable in alignment with said inlet tube one at a time, said proportioner having a unidirectional flow from said inlet member to said outlet member when in use.

2. A fire fighting foam producing proportioner comprising, a tubular body having first and second spaced ends, said body having first and second generally parallel through passages, said body including a longitudinally extending web separating said first passage from said second passage, said body having a longitudinal axis extending through said web, said web extending along substantially the entire length of said body, a tubular inlet member defining an inlet opening and fixed to said first end of said body, a tubular outlet member defining an outlet opening and fixed to said second end of said body, the axes of said members and said body being [coextensive] *on a common line,* hose connection means carried by said inlet and outlet members, said members each being connected to both of said passages, said first passage being a venturi having a throat therein, said second passage having substantially uniform cross sectional area from one end to the other, the total of the cross sectional area of said first passage throat and the cross sectional area of said second passage being greater than the cross sectional area of the [inlet] *outlet* opening, the cross sectional area of the inlet opening being greater than the cross sectional area of the outlet opening, a shut off valve carried by the said body and disposed in said second passage to open and close said second passage, a foam agent inlet opening communicating with said first passage and a foam agent conducting assembly communicating with said foam agent inlet passage, said assembly having a check valve permitting only unidirectional flow from said assembly into said foam agent inlet opening, said assembly having a flow control valve having a plurality of volume flow positions, said flow control valve in series with said check valve, a member in operative control with said flow control valve, and detent means for holding said member in selected position, said proportioner having a unidirectional flow from said inlet member to said outlet member when in use.

3. A fire fighting foam producing proportioner comprising, a tubular body having first and second spaced ends, said body having first and second generally parallel through passages, said body including a longitudinally extending web separating said first passage from said second passage, said body having a longitudinal axis extending through said web, said web extending along substantially the entire length of said body, a tubular inlet member defining an inlet opening and fixed to said first end of said body, a tubular outlet member defining an inlet opening and fixed to said second end of said body, said inlet [an] *and* outlet members including hose connection means, the axes of said members and said body being [coextensive] *on a common line,* said members each being connected to both of said passages, said first passage being a venturi having a throat therein, said second passage having substantially uniform cross sectional area from one end to the other, the total of the cross sectional area of said first passage throat and the cross sectional area of said second passage being greater than the cross sectional area of the [inlet] *outlet* opening, the cross sectional area of the inlet opening being greater than the cross sectional area of the outlet opening, a shut off valve carried by the said body and disposed in said second passage to open and close said second passage, a foam agent inlet opening communicating with said first passage, and a foam agent conducting assembly communicating with said foam agent inlet passage, said proportioner having a unidirectional flow from said inlet member to said outlet member when in use.

*4. A fire fighting foam producing proportioner comprising, a tubular body having first and second spaced ends, said body having first and second generally parallel through passages, said body including a longitudinally extending web separating said first body passage from said second body passage, said body having a longitudinal axis extending through said web, said web extending along substantially the entire length of said body, said body having first and second outwardly directed flanges at said first and second ends respectively, a tubular inlet member having inner walls defining an inlet passage terminating at an inlet opening, said inlet member having an outwardly directed flange, means connecting said first flange on said body and said flange on said inlet member to maintain the body and inlet member in fluid tight engagement, a tubular outlet member having inner walls defining an outlet passage terminating at an outlet opening, said outlet member having an outwardly directed flange, means connecting said second flange on said body and said flange on said outlet member to maintain the body and outlet member in fluid tight engagement, said inlet and outlet members including hose connection means, the axes of said inlet and outlet member passages and said body lying on a common line, the inlet and outlet openings each communicating directly with both of said body passages through said inlet and outlet passages respectively, said inlet member walls flaring smoothly and symmetrically outwardly with respect to the member axis from the inlet opening, said outlet member walls flaring smoothly and symmetrically with respect to the member axis inwardly to the outlet opening, said first body passage being a venturi having a throat therein, said second body passage having substantially uniform cross sectional area from one end to the other, the total of the cross sectional area of said first body passage throat and the cross sectional area of said second body passage being greater than the cross sectional area of the outlet opening, the cross sectional area of the inlet opening being at least as great as the cross sectional area of the outlet opening, a shut off valve carried by the said body and disposed in said second body passage to open and close said second body passage, a foam agent inlet opening communicating with said first body passage, and a foam agent conducting assembly communicating with said foam agent inlet passage, said proportioner having a unidirectional flow from said inlet member to said outlet member when in use.*

References Cited in the file of this patent or the original patent

UNITED STATES PATENTS

| | | |
|---|---|---|
| 1,679,774 | Larner | Aug. 7, 1928 |
| 2,101,356 | Zak | Dec. 7, 1937 |
| 2,164,153 | Friedrich | June 27, 1939 |
| 2,716,507 | Graves | Aug. 30, 1955 |
| 2,756,762 | Nash | July 31, 1956 |
| 2,895,710 | Sanctuary | July 21, 1959 |